Patented Sept. 26, 1944

2,358,812

UNITED STATES PATENT OFFICE 2,358,812

MATTE SMELTING OF MANGANESE

Ray G. Knickerbocker, Boulder City, Nev.

No Drawing. Application December 13, 1941,
Serial No. 422,889

9 Claims. (Cl. 75—21)

(Granted under the act of March 3, 1883, as
amended April 30, 1928; 370 O. G. 757)

This invention described herein may be manufactured and used by or for the Government for governmental purposes, without the payment to me of any royalty thereon.

My invention relates in general to the production of a concentrated manganese product from relatively poor grades of domestic ores. It relates more in particular to the production of a high grade manganese product from such ores by a matte smelting procedure.

Despite the fact that manganese is used extensively as an alloying constituent for ferrous and non-ferrous metals, and is, moreover, one of the most plentiful of the heavy metals, manganese production, particularly from relatively low grade domestic ores, has made very little progress. Heretofore, most of the manganese made available for consumption has been produced from relatively very rich ores, very little, if any, of which is found in the United States. As an illustration, ores containing from 8% to 20% manganese are exceedingly common, but they have not been made available because of the lack of any suitable process for producing a so-called ferro-grade product therefrom. It has been suggested, for example, that such ores could be employed to produce a ferro-grade product by the matte smelting procedure or by a combination of a concentrating step followed by matte smelting. One difficulty is that in producing a manganese matte of satisfactory grade by methods available, extensive slag losses of manganese have resulted.

The principal object of my invention is the provision of an improved process for producing a ferro-grade manganese product by a procedure involving smelting.

Other specific objects and features of the invention will be apparent as the description progresses.

In carrying out my invention, I take a suitable manganese ore, such as an oxide ore, mix with it an available material furnishing a source of sulphur and a reducing agent, such as a proportion of coke, and heat the mixture in a suitable furnace at a temperature high enough to melt the constituents and produce a reaction whereby the manganese is converted to manganese sulfide. Many manganese ores contain self-slagging constituents, but I may introduce slagging constituents, such as by adding to a siliceous ore a proportion of limestone. In any case, my process is carried out so that the gangue constituents are separated out into a slag layer, and a reduced constituent, such as iron, separated in the form of a lower layer, leaving a center layer of matte. The proportions of materials are controlled in such a way as to produce a matte comprising manganese sulfide which also contains admixtures of other constituents such as iron sulfide, which matte I shall refer to herein as the raw matte. Due to the fact that the matte layer does not comprise substantially entirely manganese sulfide, the manganese losses to the slag are reduced greatly.

The three layers, comprising a layer of reduced metal on the bottom, a layer of raw matte, and an upper layer of slag, may be separately tapped from the furnace, or the entire contents of the furnace may be drawn off to a forehearth or other suitable receptacle where the charge is allowed to cool. On cooling, the charge will be found to have separated again into three layers, the middle layer comprising the raw matte which I treat in accordance with further steps of my process.

The raw matte so produced is then prepared for further smelting by the addition of a relatively small proportion of a reducing agent, such as coke, and a proportion of a manganese oxide, in a manner to be described. The constituents referred to, in relatively finely divided or broken-up form, are intimately mixed and again charged into a furnace of a suitable type for carrying on a smelting operation. The charge is again heated to a melting temperature, and a reaction takes place wherein the manganese oxide of the charge reacts with the sulphur of the previously introduced metal sulfide to form manganese sulfide, the metal present as an impurity is reduced, and the charge separates into two layers, the upper layer comprising substantially a pure manganese sulfide with some admixed manganese oxide, and the lower layer comprising essentially a metal such as iron.

Those skilled in the art to which the present invention relates will understand that, depending upon the character of materials and equipment available, many modifications are possible in carrying out my process. For example, the manganese oxide may be introduced in the form of a concentrate of the ore, in which case a slag will be formed during the step of producing the pure matte. The slag, under these circumstances, will comprise only a relatively thin layer and losses of manganese to the slag will not be appreciable due to the fact that there is less volume of slag into which manganese may become dispersed. Preferably the manganese oxide is introduced in relatively pure form and, in the carrying out of my process, may comprise a product produced by sintering the pure matte to drive off sulphur. It should be noted also that the manganese oxide can be introduced into the raw matte while still in a liquid condition. As an example, the three layers produced in the initial smelting operation can be drawn off separately and the manganese oxide introduced into the molten raw matte either within the furnace after drawing off the slag or in a separate retort into which the raw matte has been introduced.

My invention lends itself to the production of a ferro-grade manganese product from many types of ores and, in many instances, the novel features of my invention may be part of a complete process wherein a sintering, gravity concentrating, flotation or hydro-metallurgical step may be employed initially to produce a better feed for the smelting furnace than is available from certain of the relatively low grade manganese ores.

As an example of a complete process for producing a ferro-grade manganese product from relatively low grade ores, reference may be had to the treatment of a carbonate ore such as the type of ore found at Chamberlain, South Dakota. A typical analysis of ore of this character is 17% manganese, 14% iron, balance some phosphorus and other metallic impurities, and the gangue. This ore is found in the form of nodules. The nodules are separated from the shale and clay constituent with which they were mixed, crushed and sintered to an oxide product, the oxide product smelted to produce a raw matte, the raw matte treated with manganese oxide to produce a pure matte, and the pure matte is broken up and sintered to a high grade ferro-product suitable as a feed for a blast furnace, or usable as a constituent to mix with a lower grade manganese product for the production of so-called spiegel. After sintering, the ore is found to contain on the order of 26% to 27% manganese. The raw matte contains only approximately 30% manganese as manganese sulfide; the pure matte approximately 55% manganese, and the final sintered product above 60% manganese. The details of carrying out this complete process, according to one example with which very good results have been obtained, are as follows:

In the sintering step, the nodules are crushed in a jaw crusher to three-eigths inch maximum. To the crushed product, 4% to 5% of coke are added of about one-quarter inch size, and about 15% of water. The aggregate is mixed thoroughly and spread in the form of a bed thirty-six inches deep, and ignited from the top while drawing 30 cubic feet of air per minute per square foot of hearth area through the bed, a vacuum of 16" to 18" being maintained below the bed. Preferably the sintering operation is carried out by feeding mechanically to a sintering machine equipped with a traveling grate, the sintering machine being constructed so that, as the grate advances, the bed of material first passes under an ignition chamber where heat is supplied to initiate combustion by suitable means such as oil burners or the like. When combustion has initiated, the coke of the charge being ignited will continue to burn when the conditions described are maintained. The sintering time is one-half to three quarters of an hour and the sintered product produced contains substantially no fines, so that there is no necessity of sifting or classifying in any way, the sintered product being a suitable feed as obtained for the smelting furnace.

The sintered product is then matte smelted to produce a raw matte. In this operation, 5% to 6% of coke is mixed with the charge for supplying a reducing agent, and approximately 30% of pyrite as a source of sulphur to produce the manganese sulfide matte. If a smelting furnace is employed of a type wherein the heat for smelting is supplied in any way other than by the use of fuel mixed with the charge, a mixture comprising 5% to 6% of coke, 30% of pyrite and 65% of the sinter cake produces a very good raw matte for the purpose of my invention. When the smelting operation is carried out in a blast furnace, these proportions are modified so that approximately three-quarters of the load is coke, the bulk of the coke obviously comprising a fuel for heating the charge. The mixture of coke, pyrite, and sinter cake is heated preferably to a temperature of 1450 degrees C. and maintained at this temperature until reaction has taken place, and the charge separates into three layers, the upper layer comprising a slag, the middle layer a relatively impure manganese sulfide, and a lower layer of iron. The time of heating will, of course, depend upon the size of the charge and the character of the equipment employed. The charge is then drawn into a forehearth and allowed to cool. On analysis, the slag is found to contain the gangue of the ore and less than 2% of manganese. The raw matte contains approximately 30% manganese as the sulfide with admixed iron sulfide.

The raw matte is then broken up and mixed with one-third of its weight of a sintered product produced from the final pure matte and comprising essentially $Mn_3O_4$ or a mixture of oxides, some of which are $MnO_2$ and some of which are partially reduced $MnO_2$. This product may be considered as $Mn_{(x)}O_{(y)}$ wherein the relation of $x$ to $y$ is greater than 1:2. The mixture of raw matte and manganese oxide is charged into a smelting furnace with approximately 5% of coke intimately mixed therewith and heated again to about 1450 degrees C., until the reaction is completed and a product is produced comprising two layers, the lower layer being substantially metallic iron and the upper layer comprising manganese sulfide with an admixture of manganese oxide. It should be noted that the melting point of manganese sulfide is approximately 1620 degrees C., but the pure matte, as produced by my process, has a melting temperature of about 1340 degrees C. due to the presence of the manganese oxide and the formation of substantially a eutectic mixture.

The two layers are separated either by drawing them separately from the furnace or flowing the entire charge into a fore-hearth and allowing the two layers to separate and solidify. The pure matte contains approximately 55% manganese by analysis.

The pure matte so produced is then sintered to better than a ferro-grade product comprising essential $Mn_3O_4$, and will analyze approximately 62% manganese. The sintering operation can be carried out with any suitable equipment, such as that described hereinabove for sintering the carbonate ore. The sulphur is driven off as $SO_2$ with some admixed $SO_3$, and the mixture of $SO_2$ and $SO_3$ may be employed in a leaching operation as part of a hydrometallurgical process which conveniently may be carried out at the same location as the smelting process for the purpose of leaching ore products relatively low in manganese.

As previously pointed out, the high grade product produced by the use of my method may be used as such, it may be mixed with a lower grade manganese product to produce a final product which still can be classified as ferro-grade, or it may be mixed with the raw matte or with another source of manganese to produce a ferromanganese product.

I deem it unnecessary to multiply examples showing the carrying out of my invention, it being obvious to those skilled in the art that I may utilize many types of manganese ores and that I may also modify extensively the details of treatment. For example, instead of employing pyrite, I may use copper sulfide, chalcopyrite, or any source of sulphur, in the production of the raw matte. Such common materials as calcium sulfide and calcium sulfate may be used, particularly where the iron content of the ore is high, or admixed with pyrite in the event this latter material is not available in quantities desired at a particular location. In connection with the use of such materials as calcium sulfide or calcium sulfate, conditions should be controlled so that the raw matte does not contain substantially in excess of 35% manganese; otherwise, the manganese losses to slag will be excessive. Those skilled in the art will understand that, in the event a naturally occurring calcium compound is employed as a source of sulphur, the calcium will go to slag, assuming the presence of adequate quantities of slag-forming material, such as silica.

I wish to point out also that, in the initial sintering of the carbonate ore, I have found it possible to employ brown lignite, suitable deposits of which are found in some of the regions in which carbonate manganese ores exist.

I have not gone into detail in discussing uses to which the pure matte may be put, but those skilled in the art will understand that a highly pure manganese sulfide containing in excess of 50% manganese as the metal can be used to advantage in many ways in the industries in which manganese plays a part. The manganese sulfide, for example, may be treated further by the so-called furnace method to produce manganese metal, such as the so-called silico-thermic or alumino-thermic process, whereby to produce a product comprising approximately 95% manganese, and useful as a direct alloying constituent for steel manufacture.

An important feature of my invention is the purification of a relatively impure or raw manganese matte. I prefer to produce this raw matte by a method such as described, wherein the losses of manganese to slag are low, and the process can be carried out economically by the use of relatively low grade manganese ores. I may, however, purify a raw or impure matte, however the product may initially have been produced.

What I claim as new and desire to protect by Letters Patent of the United States is:

1. A process for producing a manganese product from ores thereof, which includes the steps of first producing a raw matte comprising substantially a mixture of iron sulfide and manganese sulfide, and then treating the said raw matte, while in a molten condition, with an oxide of manganese to separate iron from the raw matte as the metal and produce a product comprising substantially manganese sulfide and some metallic iron.

2. A process for producing a manganese product from ores thereof, which includes the steps of first producing a raw matte comprising substantially a mixture of iron sulfide and manganese sulfide, mixing the said raw matte with a product comprising a manganese oxide, charging the mixture into a furnace, heating the same above the melting point thereof, drawing the melted product from the furnace, and allowing the product to separate into two layers comprising substantially metallic iron and a high manganese product substantially free of iron.

3. A process for producing a manganese product from ores thereof, which includes the steps of first producing a raw matte comprising substantially a mixture of iron sulfide and manganese sulfide, and then treating the said raw matte while in a molten condition with an oxide of manganese to separate iron from the raw matte as the metal and produce a product comprising substantially a mixture of manganese sulfide and a relatively smaller proportion of manganese oxide.

4. A process for producing a smelted product high in manganese from a manganese ore, which comprises mixing the said ore with a relatively large proportion of iron sulfide, smelting the product so produced to form a raw matte consisting principally of manganese sulfide and iron sulfide, a proportion of metallic iron, and a slag layer very low in percentage of contained manganese, separating said raw matte from the slag, mixing the said raw matte with a manganese oxide, and heating to reaction to produce a substantially iron-free matte in the manner described.

5. A process for producing a smelted product high in manganese from a manganese ore, which comprises mixing the said ore with a relatively large proportion of iron sulfide, smelting the product so produced to form a raw matte consisting principally of manganese sulfide and iron sulfide, a proportion of metallic iron, and a slag layer very low in percentage of contained manganese, separating said raw matte from the slag, mixing the said raw matte with a manganese oxide ore product, and firing the same to produce a relatively pure matte containing in excess of about 55% manganese.

6. A process for producing a manganese product from an oxide ore, which comprises mixing the ore with a proportion of a reactable metal sulfide greater than sufficient to react with all of the contained manganese, firing the mixture whereby to produce a relatively impure manganese matte and a slag low in manganese, separating the said impure manganese matte, mixing the said matte with a manganese oxide, and firing to produce a final matte product comprising substantially a mixture of manganese sulfide and manganese oxide.

7. A process for producing a manganese rich product from a relatively low grade manganese carbonate ore containing substantial proportions of iron, which comprises heating the ore to produce the oxide thereof and a product suitable for matte smelting, mixing the resulting product with a relatively large amount of a metal sulfide capable of reacting to produce manganese sulfide, smelting the mixture to produce a raw matte containing a relatively large proportion of iron and a slag low in manganese, mixing the raw matte with a manganese oxide, and smelting to produce a product substantially free of iron in the manner described.

8. In a process for producing a manganese product from ores thereof, the steps which comprise first producing a manganese matte containing iron, and then treating said matte in molten condition with an oxide of manganese, whereby iron is precipitated in metallic form and removed from the thus-purified matte.

9. The process of claim 8 wherein at least a portion of the purified matte is oxidized to produce oxide of manganese for purification of further quantities of iron-containing manganese matte.

RAY G. KNICKERBOCKER.